(12) United States Patent
Namba et al.

(10) Patent No.: US 11,845,436 B2
(45) Date of Patent: Dec. 19, 2023

(54) VEHICLE TRAVEL LOCUS TRANSMISSION SYSTEM AND VEHICLE TRAFFIC CONTROL SYSTEM

(71) Applicant: SUBARU CORPORATION, Tokyo (JP)

(72) Inventors: Ryosuke Namba, Tokyo (JP); Keisuke Kuwahara, Tokyo (JP); Masato Mizoguchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 134 days.

(21) Appl. No.: 17/529,535

(22) Filed: Nov. 18, 2021

(65) Prior Publication Data

US 2022/0169253 A1 Jun. 2, 2022

(30) Foreign Application Priority Data

Nov. 30, 2020 (JP) .................................. 2020-198432

(51) Int. Cl.
*B60W 30/18* (2012.01)
*G01C 21/28* (2006.01)
(Continued)

(52) U.S. Cl.
CPC ....... *B60W 30/18163* (2013.01); *G01C 21/28* (2013.01); *G01S 19/47* (2013.01);
(Continued)

(58) Field of Classification Search
CPC ....... B60W 30/18163; B60W 2520/28; B60W 2556/45; B60W 2556/50; G01C 21/28;
G01C 21/30; G01S 19/47; G05D 1/0272; G05D 1/0274; G05D 1/0278; G05D 2201/0213; G05D 1/0061; G05D 1/0088;
(Continued)

(56) References Cited

U.S. PATENT DOCUMENTS

| 2013/0173879 | A1* | 7/2013 | Suzuki | ................ G08G 1/0969 711/165 |
|---|---|---|---|---|
| 2019/0033082 | A1* | 1/2019 | Asai | ...................... G05D 1/0274 |
| 2020/0312129 | A1 | 10/2020 | Oyama | |

FOREIGN PATENT DOCUMENTS

| JP | 2019-66193 A | 4/2019 | |
|---|---|---|---|
| JP | 2020-160939 A | 10/2020 | |
| WO | WO-2015083420 A1 * | 6/2015 | ............. G09B 9/042 |

* cited by examiner

*Primary Examiner* — Aryan E Weisenfeld
(74) *Attorney, Agent, or Firm* — TROUTMAN PEPPER HAMILTON SANDERS LLP

(57) ABSTRACT

A vehicle travel locus transmission system to be mounted on a vehicle includes a GNSS receiver, a vehicle-side transceiver, a locator processor, a wheel speed sensor, a gyro sensor, and an acceleration rate sensor. The locator processor generates, on predetermined cycles, a latest first linear coordinate as a linear function parameter that couples latest first positional coordinates and second positional coordinates on a previous cycle. The first and second positional coordinates are to be acquired on the basis of a positioning signal received by the GNSS receiver. On the condition that an angle formed by the first linear coordinate with an extension of a second linear coordinate generated on the previous cycle exceeds a predetermined threshold, the locator processor sends data regarding the first linear coordinate together with vehicle identification data, from the vehicle-side transceiver to an external device.

6 Claims, 13 Drawing Sheets

(51) Int. Cl.
*G05D 1/02* (2020.01)
*G01S 19/47* (2010.01)

(52) U.S. Cl.
CPC ......... *G05D 1/0272* (2013.01); *G05D 1/0274* (2013.01); *G05D 1/0278* (2013.01); *B60W 2520/28* (2013.01); *B60Y 2400/3032* (2013.01)

(58) Field of Classification Search
CPC .... G05D 1/021; G05D 1/0214; G05D 1/0221; G05D 1/0223; B60Y 2400/3032
See application file for complete search history.

VEHICLE TRAVEL LOCUS TRANSMISSION SYSTEM AND VEHICLE TRAFFIC CONTROL SYSTEM

CROSS-REFERENCE TO RELATED APPLICATION

This application claims priority from Japanese Patent Application No. 2020-198432 filed on Nov. 30, 2020, the entire contents of which are hereby incorporated by reference.

BACKGROUND

The technology relates to a vehicle travel locus transmission system that transfers a traveling state of an own vehicle for map-matching to an external traffic control apparatus, and a vehicle traffic control system.

In recent years, various techniques have been proposed for automated driving of vehicles. Automated driving is intended to reduce a burden to drivers and to provide comfortable driving. Some of the techniques have already been put in practice. For example, a localization technique is known in which a vehicle performs positioning of an own vehicle on the basis of positioning signals from positioning satellites of a global navigation satellite system (GNSS). The vehicle reflects the position of the own vehicle on road map data. Localization means estimation of the position of the own vehicle.

For example, Japanese Unexamined Patent Application Publication (JP-A) No. 2019-66193 discloses a technique including comparing a travel locus to a travel locus obtained from a map curvature based on a position of an own vehicle map-matched with road map data, and calculating a sectional error. A sectional error means a deviation in a longitudinal direction. On the basis of the sectional error, correction is made on the longitudinal direction of the position of the own vehicle map-matched with the road map data.

Moreover, a traffic control system is known in which a server device of an external traffic control apparatus holds map data, and a plurality of vehicles each include a GNSS antenna. The server device of the external traffic control apparatus communicates with the plurality of vehicles, to distribute data to the vehicles or give instructions regarding automated driving.

For example, JP-A No. 2020-160939 discloses a traffic control system that makes it possible to create a traffic flow to suppress traffic congestion in advance even in a traffic environment with mixture of various vehicles traveling in a predetermined section.

SUMMARY

An aspect of the technology provides a vehicle travel locus transmission system to be mounted on a vehicle. The vehicle travel locus transmission system includes a global navigation satellite system (GNSS) receiver, a vehicle-side transceiver, a locator processor, a wheel speed sensor, a gyro sensor, and an acceleration rate sensor. The GNSS receiver is configured to receive a positioning signal. The vehicle-side transceiver is configured to send and receive data to and from an external device. The locator processor is configured to perform calculation on the basis of road map data. The wheel speed sensor is configured to detect a rotation speed of a wheel of the vehicle. The gyro sensor is configured to detect an angular speed or an angular acceleration rate of the vehicle. The acceleration rate sensor is configured to detect an acceleration rate of the vehicle. The locator processor is configured to generate, on predetermined cycles, a latest first linear coordinate as a linear function parameter that couples latest first positional coordinates and second positional coordinates on a previous cycle. The first positional coordinates and the second positional coordinates are to be acquired on the basis of the positioning signal received by the GNSS receiver. On the condition that an angle formed by the first linear coordinate with an extension of a second linear coordinate generated on the previous cycle exceeds a predetermined threshold, the locator processor is configured to send data regarding the first linear coordinate together with vehicle identification data, from the vehicle-side transceiver to the external device.

An aspect of the technology provides a vehicle traffic control system provided with a traffic control apparatus. The traffic control apparatus includes a device-side transceiver. The device-side transceiver is configured to send and receive data to and from a vehicle travel locus transmission system. The vehicle travel locus transmission system is to be mounted to a vehicle and includes a global navigation satellite system (GNSS) receiver, a vehicle-side transceiver, a locator processor, a wheel speed sensor, a gyro sensor, and an acceleration rate sensor. The GNSS receiver is configured to receive a positioning signal. The vehicle-side transceiver is configured to send and receive data to and from the device-side transceiver. The locator processor is configured to perform calculation on the basis of road map data. The wheel speed sensor is configured to detect a rotation speed of a wheel of the vehicle. The gyro sensor is configured to detect an angular speed or an angular acceleration rate of the vehicle. The acceleration rate sensor is configured to detect an acceleration rate of the vehicle. The locator processor is configured to generate, on predetermined cycles, a latest first linear coordinate as a linear function parameter that couples latest first positional coordinates and second positional coordinates on a previous cycle. The first positional coordinates and the second positional coordinates are to be acquired on the basis of the positioning signal received by the GNSS receiver. On the condition that an angle formed by the first linear coordinate with an extension of a second linear coordinate generated on the previous cycle exceeds a predetermined threshold, the locator processor is configured to send data regarding the first linear coordinate together with vehicle identification data, from the vehicle-side transceiver to the device-side transceiver. The vehicle traffic control system includes a server device that is coupled to the device-side transceiver and holds road map data. On the condition that the server device receives the first linear coordinate regarding the vehicle identification data, the server device is configured to search the road map data for a past first travel locus regarding the vehicle identification data, and match the first linear coordinate with the road map data to map the first linear coordinate as a new second travel locus onto the road map data.

An aspect of the technology provides a vehicle travel locus transmission system to be mounted on a vehicle. The vehicle travel locus transmission system includes a global navigation satellite system (GNSS) receiver, a vehicle-side transceiver, circuitry, a wheel speed sensor, a gyro sensor, and an acceleration rate sensor. The GNSS receiver is configured to receive a positioning signal. The vehicle-side transceiver is configured to send and receive data to and from an external device. The circuitry is configured to perform calculation on the basis of road map data. The wheel speed sensor is configured to detect a rotation speed of a wheel of the vehicle. The gyro sensor is configured to detect an angular speed or an angular acceleration rate of the vehicle. The acceleration rate sensor is configured to detect an acceleration rate of the vehicle. The circuitry is configured to generate, on predetermined cycles, a latest first linear coordinate as a linear function parameter that couples latest first positional coordinates and second positional coordinates on a previous cycle. The first positional coordinates and the second positional coordinates are to be acquired on the basis of the positioning signal received by the GNSS receiver. On the condition that an angle formed by the first linear coordinate with an extension of a second linear coordinate generated on the previous cycle exceeds a predetermined threshold, the circuitry is configured to send data regarding the first linear coordinate together with vehicle identification data, from the vehicle-side transceiver to the external device.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
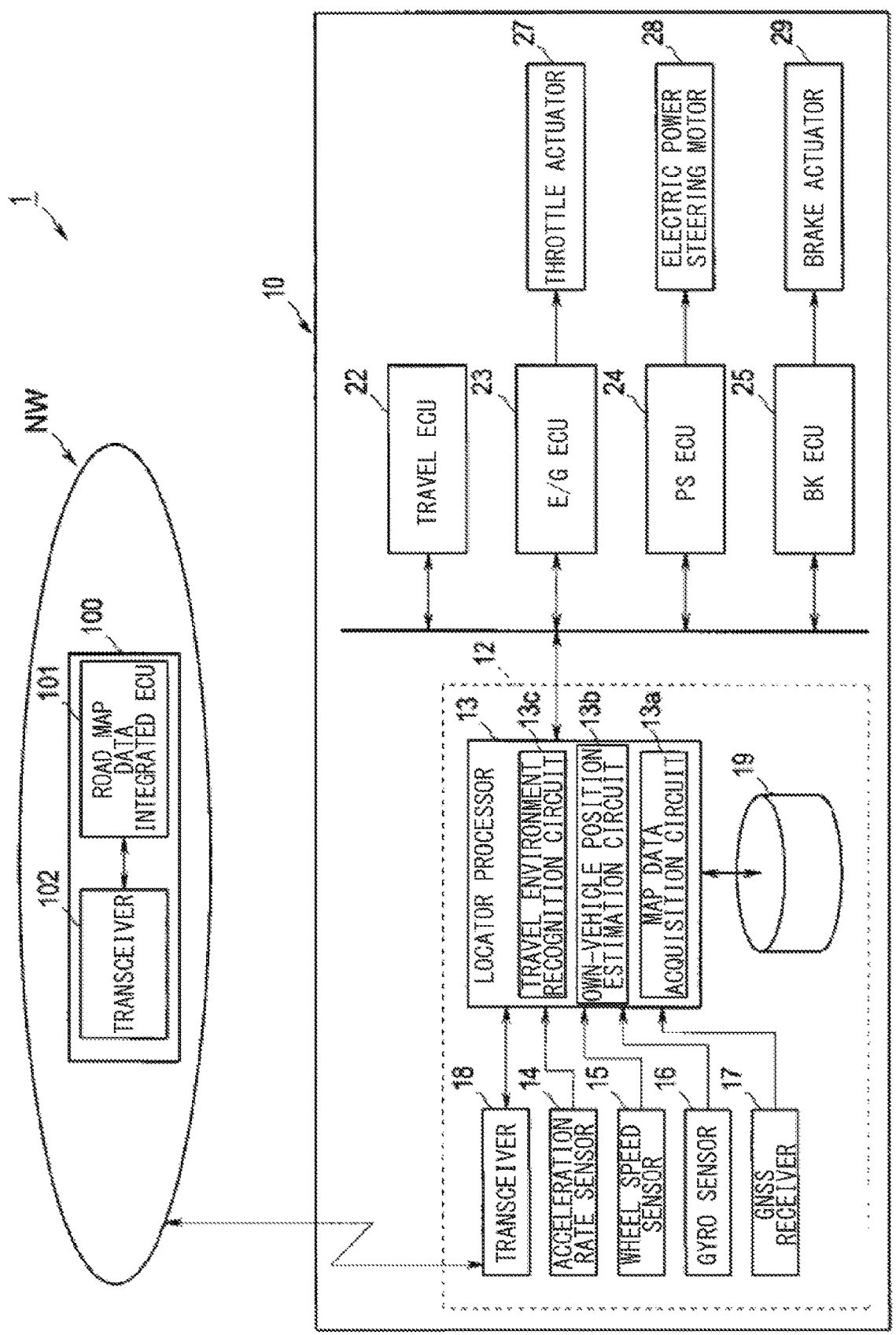
FIG. 1 is an overall configuration diagram of a vehicle travel control system.

For example, a server device of a traffic control apparatus may perform matching of positional data of each vehicle with road map data, to identify a traveling lane of each vehicle. The positional data may be sent from each vehicle to the server device on constant cycles.

In this example, however, the positional data including latitude and longitude data is sent to the external traffic control apparatus on the constant cycles from a plurality of vehicles. This results in a huge amount of data transmission. Processing the positional data from the plurality of the vehicles contributes to an increase in a communication load and a processing load, as well as an increase in an amount of data to be held by the traffic control apparatus.

It is desirable to provide a vehicle travel locus transmission system and a vehicle traffic control system that make it possible to reduce a communication load between a traffic control apparatus and each vehicle, a data processing load by the traffic control apparatus, and/or an amount of data to be held by the traffic control apparatus.

In the following, some example embodiments of the technology are described in detail with reference to the accompanying drawings. The drawings relate to one embodiment of the disclosure. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

FIG. 1 is an overall configuration diagram of a travel control system.

Figure 2:
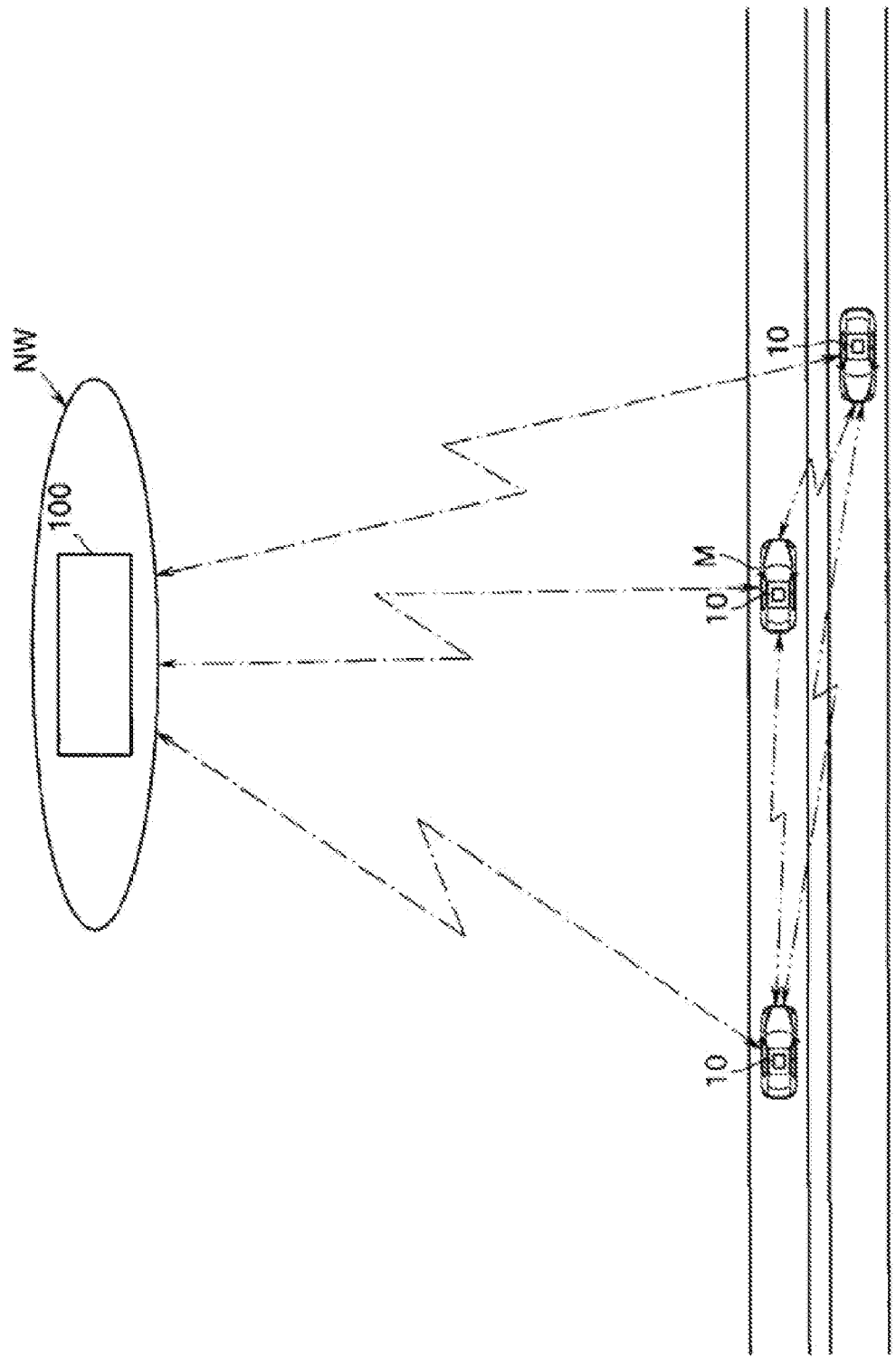
FIG. 2 illustrates road-to-vehicle communication and vehicle-to-vehicle communication.

As illustrated in FIGS. 1 and 2, the travel control system 1 according to this embodiment may include, without limitation, a travel control device 10 and a plurality of traffic control apparatuses 100. The travel control device 10 may be mounted on each of a plurality of vehicles. The plurality of the traffic control apparatuses 100 may be provided in a network environment NW. In the network environment NW, a plurality of the travel control devices 10 may be coupled by wireless communication. The traffic control apparatus 100 may be provided as, for example, a server device in a network environment by cloud computing or edge computing, or in a network environment by a network of road ancillary equipment.

The traffic control apparatus 100 may sequentially integrate road map data transmitted from the travel control device 10 of each of the vehicles, to update the road map data. The traffic control apparatus 100 may transmit the updated road map data to each of the vehicles. The traffic control apparatus 100 may include, without limitation, a road map data integrated ECU 101 and a transceiver 102. The road map data integrated ECU 101 may serve as an internal server.

The road map data integrated ECU 101 may integrate the road map data collected from the plurality of the vehicles through the transceiver 102, and sequentially update the road map data regarding the vehicles on the road. The road map data may include, for example, a dynamic map, and include four layers of data. The four layers of data may include, for example, static data and quasi-static data, and quasi-dynamic data and dynamic data. The static data and the quasi-static data mainly constitute road data. The quasi-dynamic data and the dynamic data mainly constitute traffic data.

The static data may include data for which an update frequency within one month is desired. Non-limiting examples of the static data may include roads, structures on the roads, lane data, road surface data, and permanent regulation data. The quasi-static data may include data for which an update frequency within one hour is desired. Non-limiting examples of the quasi-static data may include traffic regulation data regarding, for example, road construction and events, wide-area weather data, and traffic congestion prediction.

The quasi-dynamic data may include, for example, data for which an update frequency within one minute is desired. Non-limiting examples of the quasi-dynamic data may include primary travel obstacle situations, actual accident conditions, and narrow-area weather data, e.g., actual congestion conditions, travel regulations, falling objects, and obstacles at the time of observation.

The dynamic data may include data for which an update frequency within one second is desired. Non-limiting examples of the dynamic data may include data to be transmitted and exchanged between mobile bodies, data regarding traffic signals currently in operation, data regarding pedestrians and motorcycles in intersections, and data regarding vehicles passing straight through the intersections.

Such road map data is maintained and/or updated in a cycle until the next piece of data is received from each of the vehicles. The updated road map data is appropriately transmitted to each of the vehicles through the transceiver 102.

The travel control device 10 of the vehicle may include, without limitation, a locator unit 12 as a unit that recognizes a travel environment outside the vehicle. The travel control device 10 may further include, without limitation, a travel control unit (hereinafter referred to as "travel ECU") 22, an engine control unit (hereinafter referred to as "E/G ECU") 23, a power steering control unit (hereinafter referred to as "PS ECU") 24, and a brake control unit (hereinafter referred to as "BK ECU") 25. The PS ECU 24 may serve as a steering control unit. The control units 22 to 25, as well as a travel environment recognition unit and the locator unit 12, may be coupled together through an in-vehicle communication line such as a CAN (Controller Area Network).

The locator unit 12 may estimate a position of an own vehicle, or an own-vehicle position, on a road map. The locator unit 12 may include, without limitation, a locator processor 13. The locator processor 13 may serve as a locator calculation unit that estimates the own-vehicle position. To input side of the locator processor 13, sensors may be coupled. The sensors are provided for estimation of a position of a vehicle M, or the own-vehicle position. The sensors may include, without limitation, an acceleration rate sensor 14, a wheel speed sensor 15, a gyro sensor 16, and a GNSS receiver 17. The acceleration rate sensor 14 may detect longitudinal and lateral acceleration rates of the vehicle M. The wheel speed sensor 15 may detect rotation speeds of front-right, front-left, rear-right, and rear-left wheels. The gyro sensor 16 may detect an angular speed or an angular acceleration rate of the own vehicle. The GNSS receiver 17 may receive positioning signals transmitted from a plurality of positioning satellites.

Moreover, to the locator processor 13, a vehicle-side transceiver 18 may be coupled. The vehicle-side transceiver 18 may send and receive data to and from the traffic control apparatus 100, or perform road-to-vehicle communication, as indicated by long dashed short dashed lines in FIG. 2. The vehicle-side transceiver 18 may send and receive data to and from surrounding vehicles, or perform vehicle-to-vehicle communication, as indicated by long dashed double-short dashed lines in FIG. 2.

Furthermore, to the locator processor 13, a high-precision road map database 19 may be coupled. The high-precision road map database 19 may include a large-capacity storage medium such as a hard disk drive (HDD), and hold high-precision road map data, i.e., a dynamic map. It is to be noted that the road map data may be held by a device outside the vehicle, received from the device outside the vehicle, and provided to the locator processor 13.

The high-precision road map data may include, without limitation, similar data to the road map data sequentially updated in the road map data integrated ECU 101 as mentioned above, as data to be involved in a travel control of the vehicle M. That is, the high-precision road map data may include four layers of data. The four layers of data may include static data and quasi-static data, and quasi-dynamic data and dynamic data. The static data and the quasi-static data mainly constitute road data. The quasi-dynamic data and the dynamic data mainly constitute traffic data.

The locator processor 13 may include, without limitation, a map data acquisition circuit 13a, an own-vehicle position estimation circuit 13b, and a travel environment recognition circuit 13c. The map data acquisition circuit 13a may acquire route map data from a current position to a destination from the map data held in the high-precision road map database 19 on the basis of, for example, the destination set by a driver on the occasion of automated driving.

The map data acquisition circuit 13a may transmit the acquired route map data to the own-vehicle position estimation circuit 13b. The acquired route map data may include, for example, lane data on a route map. The own-vehicle position estimation circuit 13b may acquire positional coordinates of the vehicle M on the basis of the positioning signals received by the GNSS receiver 17.

Furthermore, the own-vehicle position estimation circuit 13b may perform map-matching of the acquired positional coordinates with the route map data, to estimate the own-vehicle position on the road map and to recognize left and right lane lines. The lane lines define a traveling path of the own vehicle, or a traveling lane. Thus, the own-vehicle position estimation circuit 13b may acquire a road curvature of a centerline of the traveling lane. The road curvature may be held in the road map data.

Moreover, in an environment where valid positioning signals from the positioning satellites are hardly received because of lowered sensitivity of the GNSS receiver 17, e.g., in traveling inside a tunnel, the own-vehicle position estimation circuit 13b may switch to autonomous navigation and estimate the own-vehicle position on the road map data, on the basis of the vehicle speed, the angular speed, and the longitudinal and lateral acceleration rates. The vehicle speed is obtained on the basis of the wheel speeds detected by the wheel speed sensor 15. The angular speed is detected by the gyro sensor 16. The longitudinal and lateral acceleration rates are detected by the acceleration rate sensor 14.

Furthermore, upon estimating the own-vehicle position on the road map on the basis of, for example, the positioning signal received by the GNSS receiver 17 and/or the data detected by, for example, the gyro sensor 16 as mentioned above, the own-vehicle position estimation circuit 13b may determine, on the basis of the estimated own-vehicle position on the road map, a road type of the traveling path on which the vehicle M is traveling.

The travel environment recognition circuit 13*c* may update the road map data received or held in the high-precision road map database 19, to a latest state, with the use of the road map data acquired by the communication with the outside of the vehicle, i.e., the road-to-vehicle communication and the vehicle-to-vehicle communication, through the transceiver 18. This data update may be carried out not only on the static data but also on the quasi-static data, the quasi-dynamic data, and the dynamic data.

Thus, the road map data may include the road data and the traffic data acquired by the communication with the outside of the vehicle, with the real-time update of data regarding mobile bodies such as vehicles traveling on a road.

Moreover, the travel environment recognition circuit 13*c* may update the road map data received or held in the high-precision road map database 19, to a latest state. This data update may be carried out not only on the static data but also on the quasi-static data, the quasi-dynamic data, and the dynamic data.

Furthermore, the travel environment recognition circuit 13*c* may recognize, as travel environment data, road map data of a set range around the own-vehicle position as a center, within the updated road map data. The own-vehicle position is estimated in the own-vehicle position estimation circuit 13*b*.

As to the range of the travel environment data to be recognized by the travel environment recognition circuit 13*c*, road map data of a range of a radius of 1 kilometer around the own-vehicle position as the center may be recognized as the travel environment data.

The travel environment data and other pieces of data recognized by the travel environment recognition circuit 13*c* of the locator unit 12 may be read by the travel ECU 22.

Moreover, to input side of the travel ECU 22, various unillustrated switches and sensors may be coupled. Non-limiting examples of the switches and the sensors may include a mode changeover switch, a steering torque sensor, a brake sensor, an accelerator sensor, and a yaw rate sensor. The mode changeover switch may allow the driver to switch on or off the automated driving, or the travel control. The steering torque sensor may detect steering torque as an amount of a driving operation by the driver. The brake sensor may detect an amount of stepping down of a brake pedal as the amount of the driving operation by the driver. The accelerator sensor may detect an amount of stepping down of an accelerator pedal as the amount of the driving operation by the driver. The yaw rate sensor may detect a yaw rate that acts on the vehicle M.

The travel ECU 22 may have settings of driving modes. Non-limiting examples of the driving modes may include, without limitation, a manual driving mode, a first travel control mode and a second travel control mode, and a retreat mode. The first travel control mode and the second travel control mode are modes for the travel control. These driving modes are selectively switchable in the travel ECU 22 on the basis of, for example, an operation state of the mode changeover switch.

The manual driving mode may be a driving mode in which the driver has to keep their hands on a steering wheel. For example, the manual driving mode may be a driving mode that allows the vehicle M to travel, in accordance with the driving operations by the driver, e.g., a steering operation, an accelerator operation, and a brake operation.

The first travel control mode may also be a driving mode in which the driver has to keep their hands on the steering wheel. That is, the first travel control mode may be a so-called semi-automated driving mode that allows the vehicle M to travel along a target travel course, while reflecting the driving operations by the driver. The first travel control mode may be provided by an appropriate combination of, mainly, an adaptive cruise control (ACC), an active lane keep centering (ALKC) control, and an active lane keep bouncing control, through controlling, for example, the E/G ECU 23, the PS ECU 24, and the BK ECU 25.

The second travel control mode may be an automated driving mode that allows the vehicle M to travel in accordance with a target route, or the route map data, without allowing the driver to keep their hands on the steering wheel or make the accelerator operation and the brake operation. The second travel control mode may be provided by the appropriate combination of, mainly, the ACC, the ALKC control, and the active lane keep bouncing control, through controlling, for example, the E/G ECU 23, the PS ECU 24, and the BK ECU 25.

The retreat mode may be a mode that allows the vehicle M to stop automatically, for example, by the roadside. The retreat mode is provided for a case where, for example, in traveling in the second travel control mode, the vehicle M is no longer able to continue traveling in the second traveling control mode and fails in allowing the driver to take over the driving operations. In other words, the retreat mode assumes a case with a failure in a transition from the second travel control mode to the manual driving mode or the first travel control mode.

To output side of the E/G ECU 23, a throttle actuator 35 may be coupled. The throttle actuator 35 may cause an opening and closing operation of a throttle valve of an electronic controlled throttle. The electronic controlled throttle is provided in a throttle body of an engine. The throttle actuator 35 may adjust a flow rate of intake air by the opening and closing operation of the throttle valve on the basis of a drive signal from the E/G ECU 23, to generate a desired engine output.

To output side of the PS ECU 24, an electric power steering motor 28 as a driving source may be coupled. The electric power steering motor 28 may apply steering torque to a steering mechanism by a rotational force of a motor. In the automated driving, controlling and operating the electric power steering motor 28 on the basis of a drive signal from the PS ECU 24 causes execution of the ALKC control and a lane change control. The ALKC control includes allowing the vehicle M to keep on traveling on a current traveling lane. The lane change control is provided for, for example, an overtaking control. The lane change control includes allowing the vehicle M to move into an adjacent lane.

To output side of the BK ECU 25, a brake actuator 29 may be coupled. The brake actuator 29 may adjust brake hydraulic pressure to be supplied to a brake wheel cylinder provided on each wheel. The brake actuator 29 is driven on the basis of a drive signal from the BK ECU 25, and thereupon, braking power of a braking mechanism is generated for each wheel by the brake wheel cylinder, forcing the vehicle M to decelerate.

It is to be noted that in the vehicle M, various pieces of data, etc. distributed from the traffic control apparatus 100 is inputted to the travel environment recognition circuit 13*c* of the locator processor 13, in a state in which other traveling modes than the manual driving mode are selected, that is, in a state in which the first travel control mode, the second travel control mode, or the retreat mode is selected. On the basis of the travel environment data, the vehicle M may carry out the travel control through, for example, the E/G ECU 23, the PS ECU 24, and the BK ECU 25.

In the following, a vehicle travel locus transmission system and a vehicle traffic control system according to this embodiment are described in detail.

Figure 3:
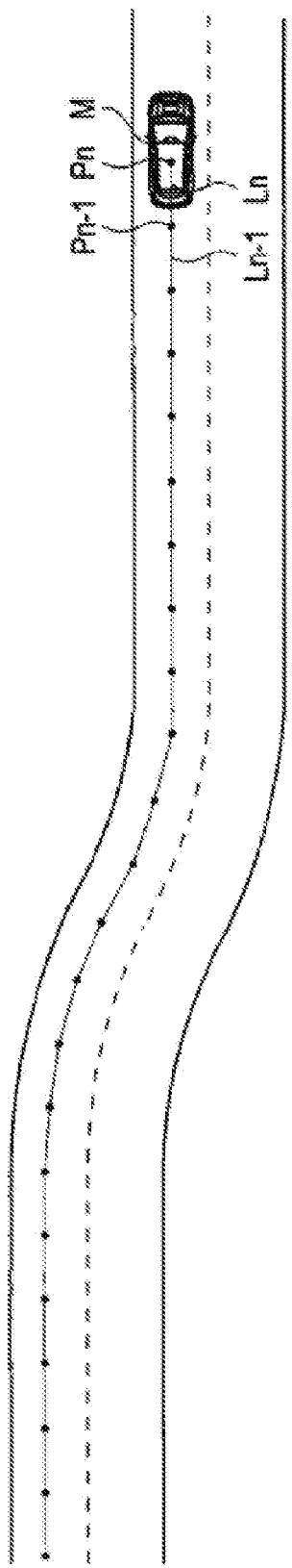
FIG. 3 illustrates a travel locus of a vehicle traveling along a curved road.
Figure 4:
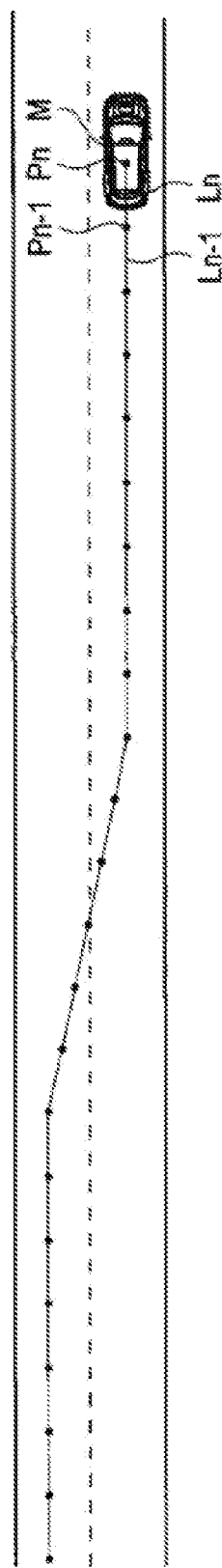
FIG. 4 illustrates a travel locus of a vehicle that has made a lane change.

First, as illustrated in FIGS. 3 and 4, the vehicle M may regularly detect a travel locus on predetermined cycles, e.g., on cycles of, for example, 500 milliseconds to 1 second. The vehicle M may detect latest positional coordinates Pn on an orthogonal coordinate system of latitude and longitude. The vehicle M may generate a linear coordinate Ln, associate the linear coordinate Ln with the map data, and store the result. The linear coordinate Ln is a linear function parameter that couples the positional coordinates Pn and positional coordinates Pn−1 on the orthogonal coordinate system. The positional coordinates Pn−1 includes latitude and longitude data detected on a previous cycle, or on one cycle before.

In one example, in the vehicle M, the positional coordinates Pn may be inputted to the locator processor 13 on the predetermined intervals or cycles. The positional coordinates Pn serve as the own-vehicle position estimated on the road map data on the basis of, for example, latitude and longitude data detected in the positioning signal received by the GNSS receiver 17, or obtained by, for example, the gyro sensor 16. It is to be noted that the positioning signal to be received by the GNSS receiver 17 is not limited to those transmitted from the positioning satellites but may be received from, for example, a communication base station.

Thus, in the vehicle M, the locator processor 13 may associate the new linear coordinate Ln as the latest travel locus data with the road map data received or held in the high-precision road map database 19. In other words, the locator processor 13 may project the linear coordinate Ln as the latest travel locus data onto the road map data. The linear coordinate Ln couples the positional coordinates Pn and the previous, or most recent, positional coordinates Pn−1. Thus, the locator processor 13 may update the road map data.

At this occasion, in a case where an angle θ formed by the latest linear coordinate Ln with an extension of a previous linear coordinate Ln−1 on one cycle before is within a predetermined threshold, e.g., ±2° (−2°≤θ≤+2°), the locator processor 13 may extend the latest, or current, linear coordinate Ln from the previous, or most recent, linear coordinate Ln−1 as a past travel locus. Thus, the locator processor 13 may associate a whole travel locus that has been traveled by the vehicle M so far, with the road map data, to update the road map data.

The vehicle M may transmit, or upload, the vehicle speed and a vehicle ID from the transceiver 18 to the device-side transceiver 102 of the traffic control apparatus 100. The vehicle speed is obtained on the basis of the wheel speed detected by the wheel speed sensor 15. In one embodiment of the disclosure, the vehicle ID may serve as "vehicle identification data".

The traffic control apparatus 100 may allow the road map data integrated ECU 101 as a server to calculate a travel distance of the vehicle M on the basis of the vehicle speed received together with the vehicle ID. Thus, the traffic control apparatus 100 may extend the new straight travel locus, or the latest linear coordinate Ln, from the previous travel locus, or the previous linear coordinate Ln−1, to associate the new straight travel locus, or the latest linear coordinate Ln, with the road map data. That is, in a case where the traffic control apparatus 100 receives the vehicle ID and the vehicle speed without receiving the new linear travel locus, or the latest linear coordinate Ln, or in a case solely with the vehicle ID and the vehicle speed transferred to the traffic control apparatus 100, the traffic control apparatus 100 may determine that the vehicle M is on straight travel. Thus, the traffic control apparatus 100 may calculate the travel distance of the vehicle M from the vehicle speed, and associate the latest travel locus along the extension of the previous travel locus, with the road map data.

In contrast, in a case where the angle θ formed by the latest linear coordinate Ln with the extension of the previous linear coordinate Ln−1 exceeds the predetermined threshold, e.g., ±2° (−2°>θ or +2°<θ), or an accumulated angle Σθ exceeds a predetermined threshold (−2°>Σθ or 2°>Σθ), the vehicle M may reset the accumulated angle Σθ to zero, and transmit, or transfer, the latest linear coordinate Ln and the vehicle ID to the traffic control apparatus 100. The linear coordinate Ln is the linear function parameter including the positional data. The predetermined threshold range of the angle θ is: −2°≤θ≤+2°. The predetermined threshold range of the accumulated angle Σθ is: −2°≤Σθ≤+2°. The locator processor 13 may transmit, or upload, the latest linear coordinate Ln and the vehicle ID, from the transceiver 18 to the transceiver 102 of the traffic control apparatus 100. The linear coordinate Ln is the linear function parameter including the positional data.

In this case, the traffic control apparatus 100 may allow the road map data integrated ECU 101 as the server to perform matching processing of the latest linear coordinate Ln as the latest, or current, travel locus of the vehicle M, onto the road map data held, on the basis of the vehicle ID and the linear function parameter received, or the latest linear coordinate Ln. The linear function parameter includes the positional data. Thus, the traffic control apparatus 100 may associate the latest linear coordinate Ln with the road map data, to update the travel locus of the vehicle M.

Description now moves on to some control examples of the vehicle travel locus transmission system and the vehicle traffic control system described above.

Figure 5:
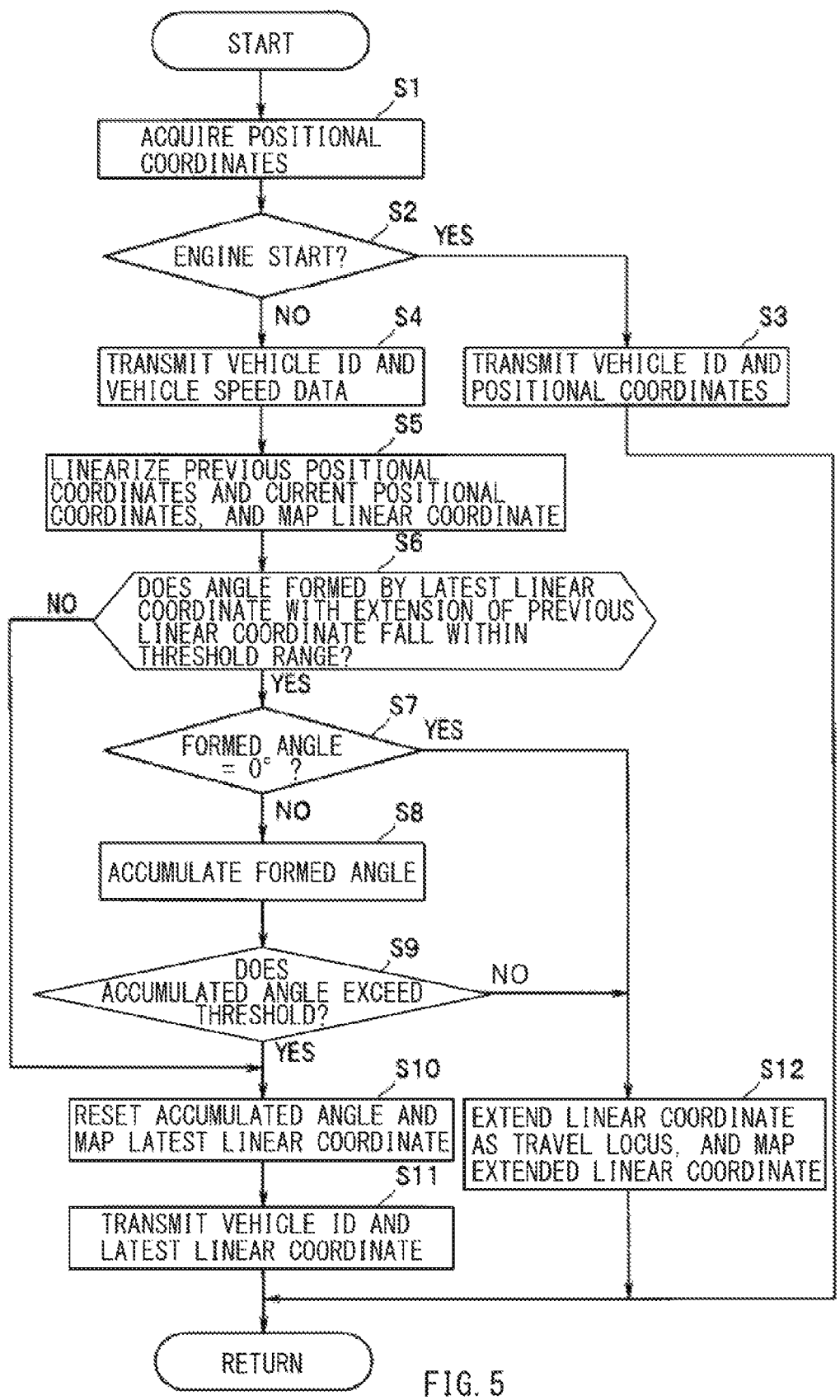
FIG. 5 is a flowchart illustrating a control example of a vehicle travel locus transmission system.

First, a control example of the vehicle travel locus transmission system is described with reference to a routine illustrated in a flowchart of FIG. 5.

First, the vehicle M may acquire the positional coordinates Pn (step S1). For example, the GNSS receiver 17 may receive the positioning signals transmitted from the plurality of the positioning satellites, and the vehicle M is supplied with the latitude and longitude data.

Thereafter, the vehicle M may determine whether or not it is time for an engine start (step S2). In a case where it is time for the engine start (YES in step S2), the vehicle M may transmit, or transfer, the vehicle ID and the positional coordinates Pn (step S3). In this example, the locator processor 13 may transmit, or transfer, the vehicle ID and the positional coordinates Pn from the transceiver 18 to the traffic control apparatus 100. The positional coordinates Pn include the latitude and longitude data as the current own-vehicle position. Thus, in the road map data integrated ECU 101 of the traffic control apparatus 100, the new vehicle ID for the vehicle M is associated with the road map data.

In step S2, in a case where it is not the time for the engine start (NO in step S2), the vehicle M may transmit, or transfer, the vehicle ID and data regarding the vehicle speed of the own vehicle (step S4). In step S4, the locator processor 13 may obtain the vehicle speed of the vehicle M on the basis of the wheel speed detected by the wheel speed sensor 15, and transmit, or transfer, the vehicle ID and the vehicle speed obtained, to the traffic control apparatus 100 from the transceiver 18.

Thereafter, the vehicle M may linearize the previous positional coordinates Pn−1 and the current positional coordinates Pn, and map the result of the linearization onto the road map data of the own vehicle (step S5). In step S5, the locator processor 13 may generate the latest linear coordinate Ln, and project the latest linear coordinate Ln onto the road map data held, to associate the linear coordinate Ln with the road map data. The linear coordinate Ln is the linear function parameter obtained by linearizing the two points on the orthogonal coordinate system, i.e., the latitude and longitude data regarding the current, or latest, positional coordinates Pn and the previous positional coordinates Pn−1.

The vehicle M may determine whether or not the angle θ formed by the new, or current, linear coordinate Ln with the extension of the previous, or most recent, linear coordinate Ln−1 is equal to or exceeds the threshold (step S6). In step S6, the locator processor 13 may calculate the angle θ formed by the newly generated, or current, linear coordinate Ln with the extension of the previous, or most recent, linear coordinate Ln−1 on the road map data, and determine whether or not the formed angle θ falls within a range of a predetermined threshold (±2°) (−2°≤θ≤+2°).

In step S6, in a case where the angle θ formed by the latest linear coordinate Ln with the extension of the previous linear coordinate Ln−1 falls within the predetermined threshold range (−2°≤θ≤+2°) (YES in step S6), the vehicle M may determine whether or not the formed angle θ is 0° (θ=0°) (step S7). In step S7, the locator processor 13 may calculate the angle θ formed by the newly generated, or current, linear coordinate Ln with the extension of the previous, or most recent, linear coordinate Ln−1, and determine whether or not the formed angle θ is 0°.

In a case where the formed angle θ is not 0° (θ≠0°) (NO in step S7), the vehicle M may accumulate the formed angle θ calculated (step S8). In step S8, the locator processor 13 may calculate the accumulated angle Σθ and store the accumulated angle Σθ. The accumulated angle Σθ is a total angle of the formed angles θ each of which is less than ±2°, calculated in the past by the locator processor 13, and accumulated on the occasion of each calculation.

Thereafter, the vehicle M may determine whether or not the accumulated angle Σθ exceeds the predetermined threshold (−2°>Σθ or +2°>Σθ) (step S9). In step S9, the locator processor 13 may determine whether or not the current accumulated angle Σθ calculated exceeds the predetermined threshold (−2°>Σθ or +2°<Σθ). The predetermined threshold range is: −2°≤Σθ≤+2°.

In a case where the current accumulated angle Σθ exceeds the threshold (−2°>Σθ or +2°<Σθ) (YES in step S9), the vehicle M may reset the accumulated angle Σθ held, and map the latest linear coordinate Ln onto the road map data of the own vehicle (step S10).

The vehicle M may also proceed to step S10, in a case where, in step S6, the angle θ formed by the latest linear coordinate Ln with the extension of the previous linear coordinate Ln−1 exceeds the threshold range (−2°>Σθ or +2°<Σθ) (NO in step S6). The predetermined threshold range is: −2°≤θ≤+2°. In this case, the vehicle M may also reset the accumulated angle Σθ held, and map the latest linear coordinate Ln onto the road map data of the own vehicle (step S10). In step S10, the locator processor 13 may reset the accumulated angle Σθ held to 0 (zero), project the latest linear coordinate Ln onto the road map data held, and associate the latest linear coordinate Ln with the road map data.

Thereafter, the vehicle M may transmit, or transfer, the vehicle ID and the latest linear coordinate Ln (step S11). In step S11, the locator processor 13 may transmit, or transfer, the vehicle ID and the latest linear coordinate Ln to the traffic control apparatus 100 from the transceiver 18.

In step S7, in a case where the angle θ formed by the latest linear coordinate Ln with the extension of the previous linear coordinate Ln−1 is 0° (θ=0°) (YES in step S7), the vehicle M may extend the linear coordinate Ln as the latest travel locus (step S12). In step S12, the locator processor 13 may extend the latest linear coordinate Ln from the previous linear coordinate Ln−1. The locator processor 13 may project the latest linear coordinate Ln onto the road map data held, and associate the latest linear coordinate Ln with the road map data.

Figure 6:
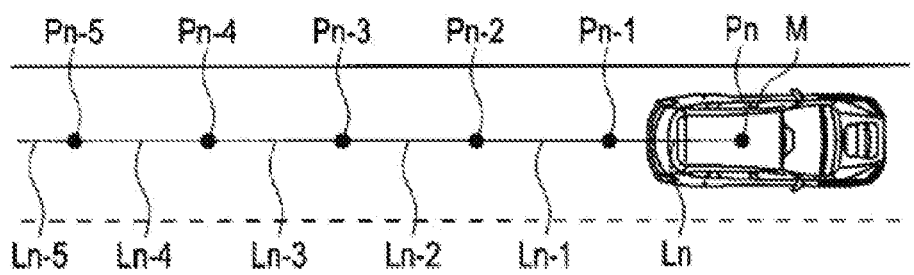
FIG. 6 illustrates a travel locus of a vehicle on straight travel.
Figure 7:
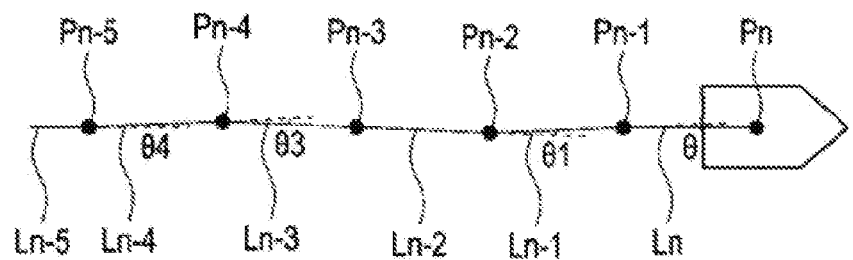
FIG. 7 illustrates positional coordinates and linear coordinates of the vehicle corresponding to FIG. 6.

Description is given next, with reference to FIGS. 6 and 7, of a state in which the vehicle M is on the straight travel.

For example, as illustrated in FIGS. 6 and 7, in the state in which the vehicle M is on the straight travel, in step S1, on predetermined cycles of, for example, 500 milliseconds to 1 second, the locator processor 13 may be supplied with the positional coordinates Pn at the relevant timing. The positional coordinates Pn include, for example, the latitude and longitude data detected in the positioning signal received by the GNSS receiver 17, or detected by, for example, the gyro sensor 16. It is to be noted that the positional coordinates Pn−1 to Pn−5 denote coordinates of the own-vehicle position inputted in the past to the locator processor 13 on the predetermined cycles.

The linear coordinates Ln−1 to Ln−5 are linear function parameters indicating the travel locus of the vehicle M. The linear coordinates Ln−1 to Ln−5 are generated in the past on the predetermined cycles by the locator processor 13 in step S5. The linear coordinate Ln−1 couples the two positional coordinates Pn−1 and Pn−2. The linear coordinate Ln−2 couples the two positional coordinates Pn−2 and Pn−3. The linear coordinate Ln−3 couples the two positional coordinates Pn−3 and Pn−4. The linear coordinate Ln−4 couples the two positional coordinates Pn−4 and Pn−5. The linear coordinate Ln−5 couples the two positional coordinates Pn−5 and Pn−6. The positional coordinates Pn−6 are unillustrated in FIGS. 6 and 7.

In steps S6 to S9, in the case where the angle θ formed by the linear coordinate Ln with the extension of the previous linear coordinate Ln−1 is 0° (θ=0°) (YES in step S7) or falls within the predetermined threshold range (−2°≤θ≤+2°) (YES in step S6), the locator processor 13 may extend, in step S12, the latest linear coordinate Ln along the extension of the linear coordinate Ln−1. The linear coordinate Ln is the linear function parameter generated on predetermined cycles. It is to be noted that a similar control is made each time the linear coordinates Ln−1 to Ln−5 in the past are generated.

For example, as illustrated in FIG. 7, when an angle θ4 formed by the linear coordinate Ln−4 with the extension of the linear coordinate Ln−5 is on positive side, an angle θ3 formed by the linear coordinate Ln−3 with the extension of the linear coordinate Ln−4 is on negative side. Accordingly, the current formed angle θ3 is subtracted from the previous formed angle θ4 (θ4−θ3). That is, in this example, vehicle-widthwise leftward inclination of the linear coordinate Ln of the vehicle M is assumed to be positive, while vehicle-widthwise rightward inclination of the linear coordinate Ln is assumed to be negative. It is to be noted that the definition of the terms positive and negative may be reversed with respect to the vehicle-widthwise leftward and rightward inclination of the linear coordinate Ln.

Thereafter, an angle θ1 formed between the linear coordinate Lm−1 with the extension of the linear coordinate Ln−2 is on the positive side, causing addition of the angle θ1 at this timing (θ4−θ3+θ1). Thereafter, the angle θ formed by the linear coordinate Ln with the extension of the linear coordinate Lm−1 is on the negative side, causing subtraction of the angle θ at this timing (θ4−θ3+θ1−θ). It is to be noted that in this example, the angle θ formed by the linear coordinate Ln−2 with the extension of the linear coordinate Ln−3 is assumed to be 0°, causing no addition nor subtraction of the angle θ at this timing.

In this way, the locator processor 13 of the vehicle M may determine that the vehicle M is on the straight travel, until the accumulated angle Σθ(= . . . θ4−θ3+30 θ1−θ) exceeds the threshold value (−2°>Σθ or +2°<Σθ). The locator processor 13 may extend the latest linear coordinate Ln as the travel locus, and project the latest linear coordinate Ln onto the road map data held, and associate the latest linear coordinate Ln with the road map data.

Figure 8:
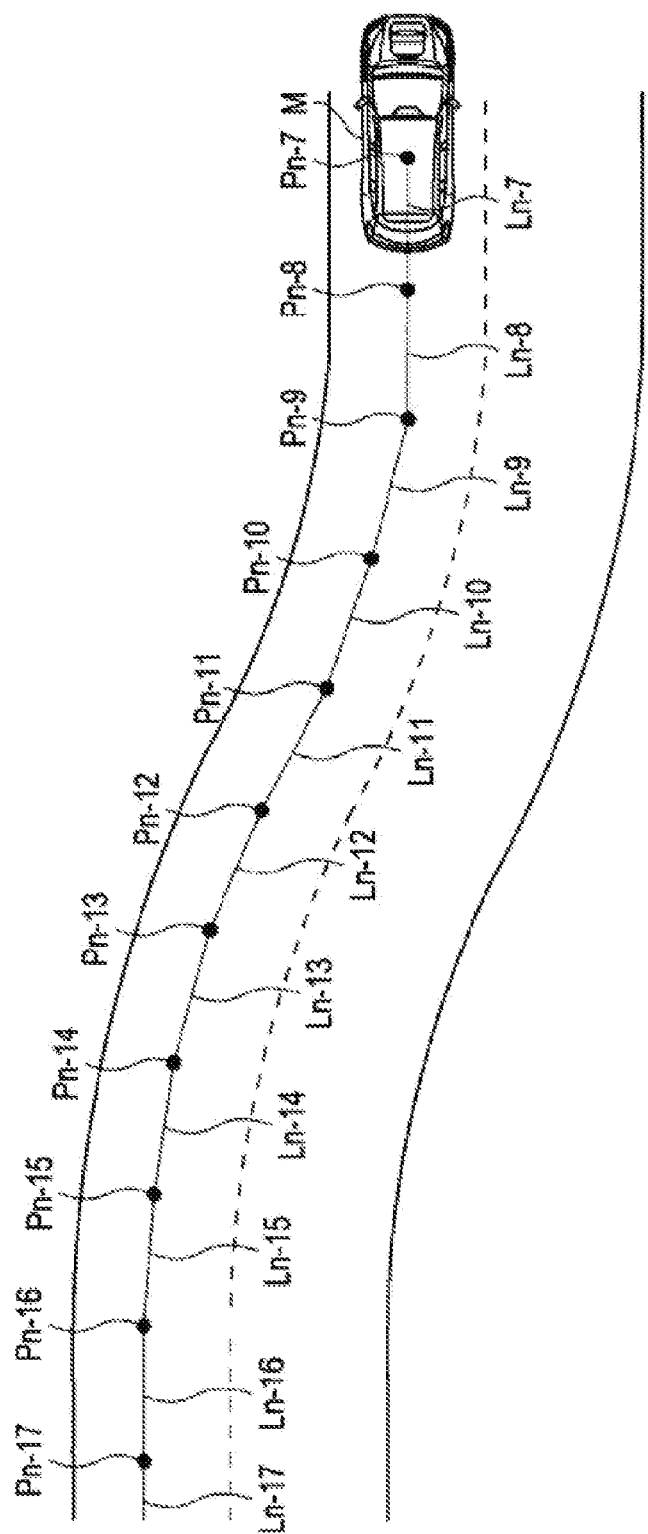
FIG. 8 illustrates a travel locus of a vehicle on curved travel.
Figure 9:
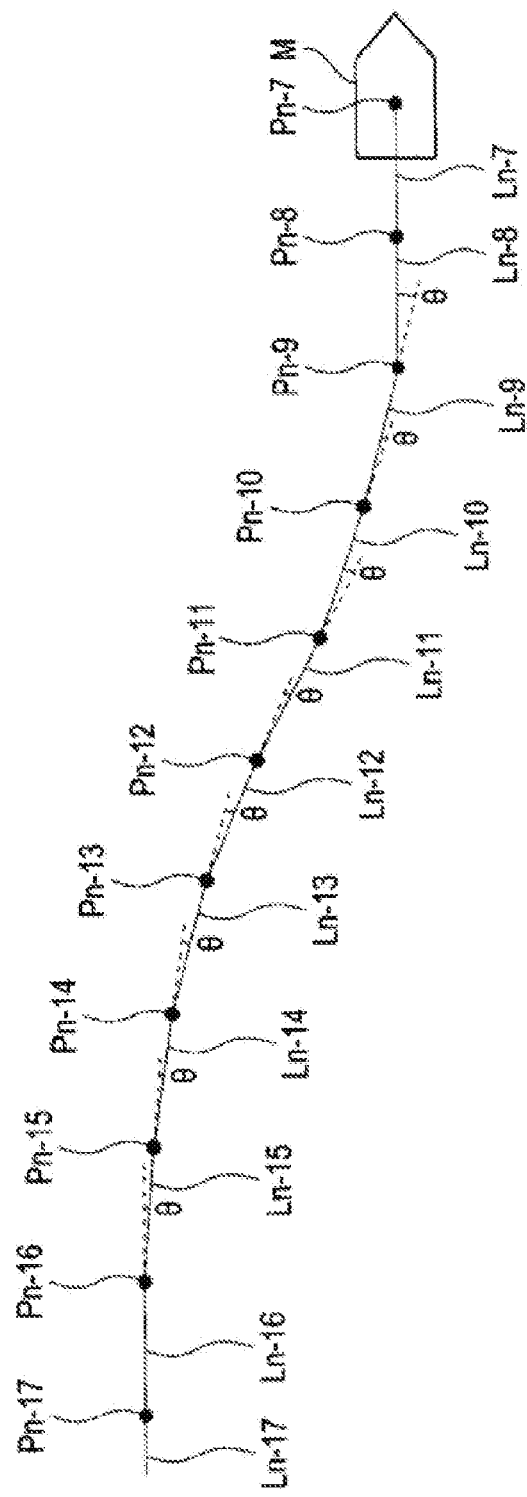
FIG. 9 illustrates positional coordinates and linear coordinates of the vehicle corresponding to FIG. 8.

Description is given next, with reference to FIGS. 8 and 9, of a state in which the vehicle M on curved travel.

For example, as illustrated in FIGS. 8 and 9, in a case where the vehicle M is on the curved travel, in step S6, the locator processor 13 may detect the formed angle θ exceeding the predetermined threshold range (−2°>θ or +2°<θ). The predetermined threshold range is: −2°≤θ≤+2°. The angle θ is formed by the linear coordinates Ln−15 to Ln−8 with the extension of corresponding ones of the previous linear coordinates Ln−16 to Ln−9. The linear coordinates Ln−15 to Ln−8 are the linear function parameters generated on the predetermined cycles of, for example, 500 milliseconds to 1 second. In this example, it is assumed that, in a section of the linear coordinates Ln−15 to Ln−8, the formed angle θ keeps on exceeding the predetermined threshold range (−2°>θ or +2°<θ). The predetermined threshold range is: −2°≤0≤+2°.

In this example, in the case where the vehicle M is on the curved travel, the locator processor 13 may reset the accumulated angle Σθ (zero reset) in step S10. The locator processor 13 may project each of the latest linear coordinates Ln−15 to Ln−8 onto the road map data held, and associate each of the latest linear coordinates Ln−15 to Ln−8 with the road map data. Thereafter, in step S11, the locator processor 13 may transmit, or upload, the linear coordinates Ln−15 to Ln−8 generated on the predetermined cycles, to the traffic control apparatus 100 together with the vehicle ID.

Figure 10:
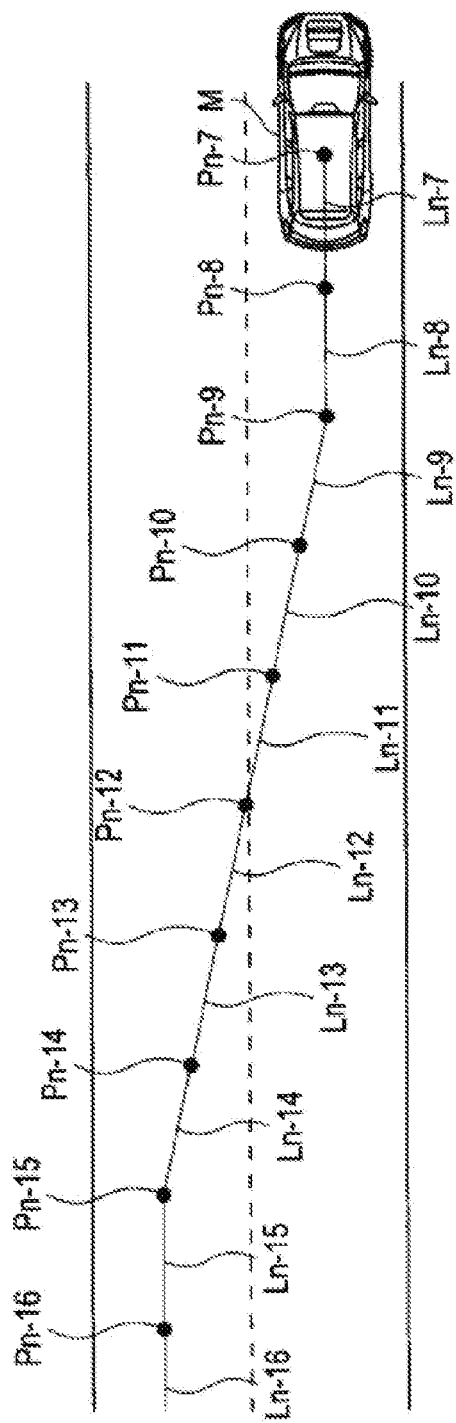
FIG. 10 illustrates a travel locus of a vehicle that has made a lane change.
Figure 11:
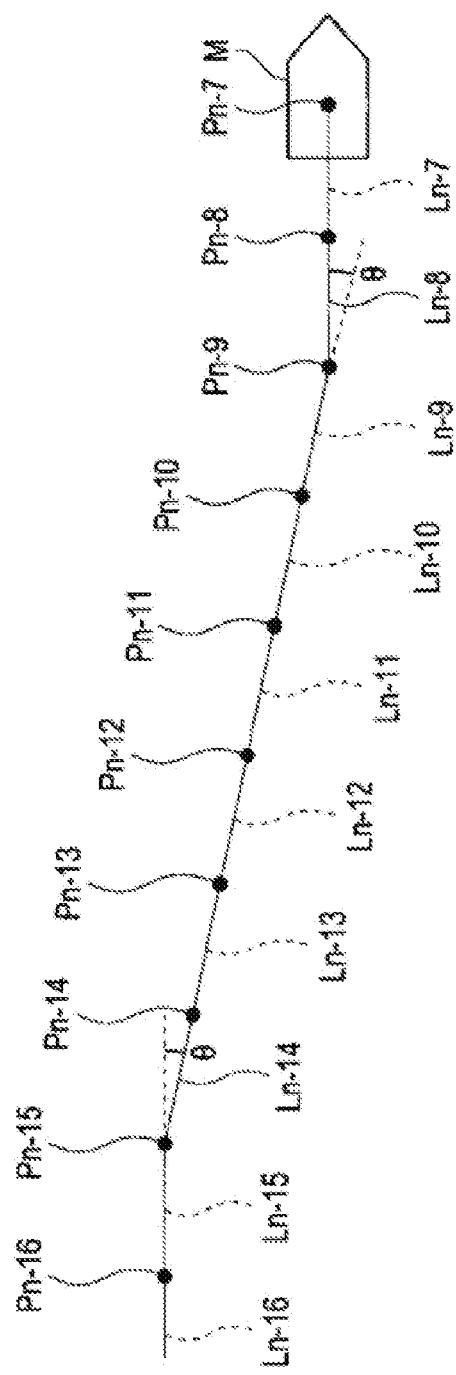
FIG. 11 illustrates positional coordinates and linear coordinates of the vehicle corresponding to FIG. 10.

Description is further made, with reference to FIGS. 10 and 11, of a state in which the vehicle M makes a lane change.

For example, as illustrated in FIGS. 10 and 11, in a state where the vehicle M makes a lane change, in step S6, the locator processor 13 may detect the formed angle θ exceeding the predetermined threshold range (−2°>θ or +2°<θ). The predetermined threshold range is: −2°≤θ≤+2°. The angle θ is formed by the linear coordinates Ln−14 and Ln−8 with the extension of corresponding ones of the previous linear coordinates Ln−15 and Ln−9. The linear coordinates Ln−14 and Ln−8 are the linear function parameters generated on the predetermined cycles of, for example, 500 milliseconds to 1 second. In this example, it is assumed that, in a section of the linear coordinates Ln−13 to Ln−9 and Ln−7 during the lane change, the formed angle θ falls within the predetermined threshold range (−2°≤θ≤+2°). The section of the linear coordinates Ln−13 to Ln−9 correspond to the positional coordinates Pn−14 to Pn−9. The section of the linear coordinate Ln−7 corresponds to the positional coordinates Pn−8 to Pn−7.

With the vehicle M at the positional coordinates Pn−14, the locator processor 13 may determine, in step S6, that the angle θ formed by the linear coordinate Ln−14 with the extension of the previous linear coordinate Ln−15 exceeds the predetermined threshold range (−2°>θ or +2°<θ) (NO in step S6). The predetermined threshold range is: −2°≤θ≤+2°. Thereupon, in step S11, the locator processor 13 may transmit, or upload, the linear coordinate Ln−14 together with the vehicle ID to the traffic control apparatus 100. The locator processor 13 may project the linear coordinate Ln−14 onto the road map data held, and associate the linear coordinate Ln−14 with the road map data. It is to be noted that, in a section of the positional coordinates Pn−14 to Pn−9, the vehicle M is on the straight travel.

Thereafter, with the vehicle M at the positional coordinates Pn−8, the locator processor 13 may determine, in step S6, that the angle θ formed by the linear coordinate Ln−8 with the extension of the previous linear coordinate Ln−9 exceeds the predetermined threshold range (−2°>θ or +2°≤θ) (NO in step S6). The predetermined threshold range is: −2°≤θ≤+2°. Thereupon, in step S11, the locator processor 13 may transmit, or upload, the linear coordinate Ln−8 together with the vehicle ID to the traffic control apparatus 100. The locator processor 13 may project the linear coordinate Ln−8 onto the road map data held, and associate the linear coordinate Ln−8 with the road map data. It is to be noted that in a section of the positional coordinates Pn−8 to P−7, the vehicle M is on the straight travel.

As described above, on the straight travel, the vehicle M may transmit, or upload, the vehicle ID and the vehicle speed to the traffic control apparatus 100 on the predetermined cycles. The vehicle M may store the latest linear coordinate Ln in the road map data held in the locator processor 13, without transmitting, or uploading, the latest linear coordinate Ln to the traffic control apparatus 100.

In addition, the vehicle M may transmit, or upload, the vehicle ID, the vehicle speed, and the latest linear coordinate Ln to the traffic control apparatus 100 in the case where, for example, the vehicle M is on the curved travel or making the lane change, with the angle θ formed by the latest linear coordinate Ln with the extension of the previous linear coordinate Lm−1 exceeding the predetermined threshold, e.g., ±2°.

Although not described above, the vehicle M may also transmit, or upload, the latest linear coordinate Ln to the traffic control apparatus 100 in a case where the vehicle M makes a right turn or a left turn. This is because, in such a case as well, the angle θ formed by the latest linear coordinate Ln with the extension of the linear coordinate Lm−1 exceeds the predetermined threshold value, e.g., ±2°.

In the following, a control example to be carried out by the traffic control apparatus 100 in the vehicle traffic control system is described with reference to routines illustrated in flowcharts of FIGS. 12 and 13.

Figure 12:
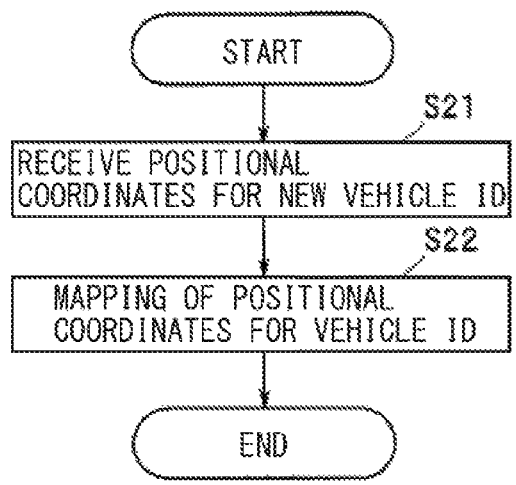
FIG. 12 is a flowchart illustrating a control example on the occasion that a vehicle traffic control system receives positional coordinates of a new vehicle.
Figure 13:
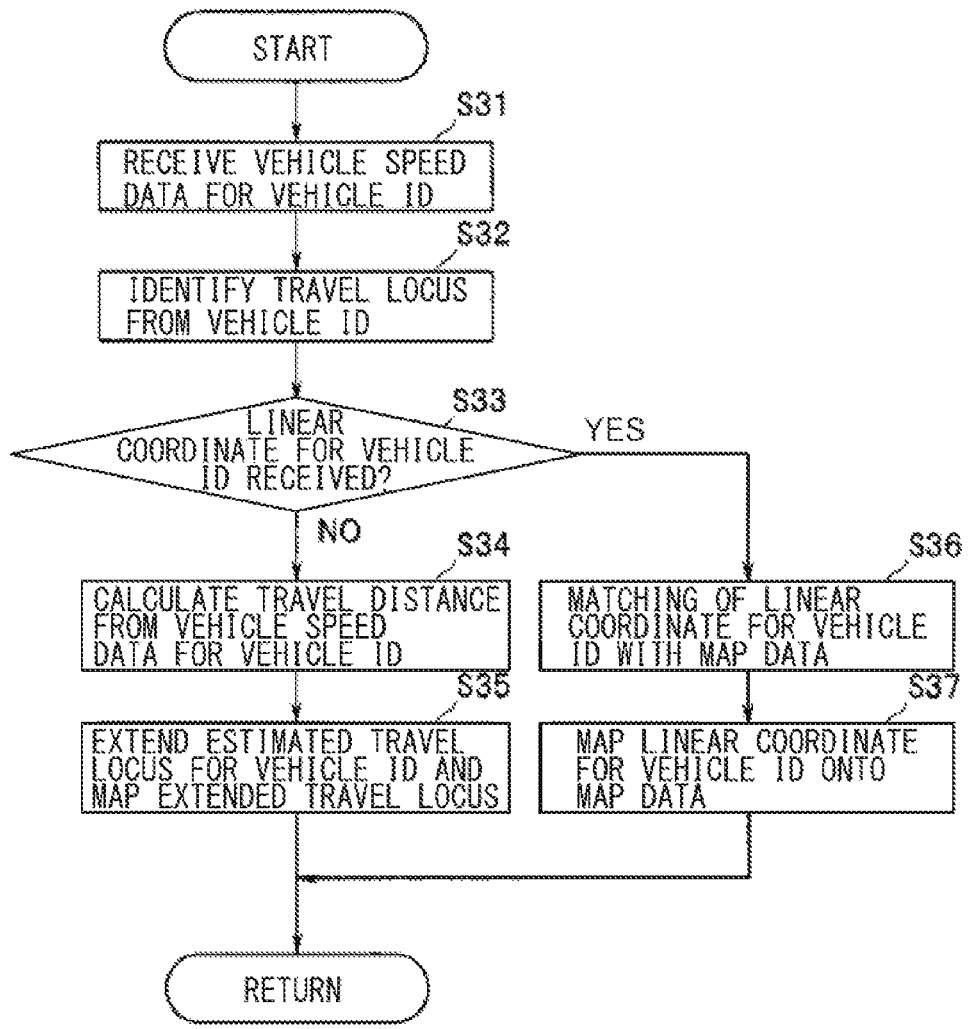
FIG. 13 is a flowchart illustrating a control example on the occasion of map-mapping of a travel locus of a vehicle by the vehicle traffic control system.

As illustrated in FIG. 12, the traffic control apparatus 100 in the vehicle traffic control system may receive the positional coordinates Pn for the new vehicle ID (step S21). Thereupon, on the basis of the positional coordinates Pn, the traffic control apparatus 100 may map the vehicle ID, i.e., register the vehicle ID in the road map data (step S22). In step S21, the road map data integrated ECU 101 may receive the positional coordinates Pn for the new vehicle ID, and thereupon, in step S22, the road map data integrated ECU 101 may associate the positional coordinates Pn for the vehicle ID with the map data held.

The traffic control apparatus 100 may receive the vehicle speed data for the vehicle ID that has already been mapped, or registered in the road map data (step S31). Thereupon, the traffic control apparatus 100 may identify the travel locus for the vehicle ID (step S32). In step S32, the road map data integrated ECU 101 may search the road map data for the previous, or most recent, linear coordinate Lm−1 or an estimated travel path regarding the registered vehicle ID, to identify the linear coordinate Lm−1 or the estimated travel path. The linear coordinate Lm−1 is an actual travel path for the registered vehicle ID.

Thereafter, the traffic control apparatus 100 may determine whether or not the latest linear coordinate Ln for the vehicle ID has been received (step S33). In step S33, the determination as to whether or not the latest linear coordinate Ln for the vehicle ID has been received may be made by the road map data integrated ECU 101.

In step S33, in a case where the latest linear coordinate Ln for the vehicle ID has not been received by the road map data integrated ECU 101 (NO in step S33), the traffic control apparatus 100 may calculate the travel distance on the basis of the vehicle speed data for the vehicle ID (step S34). In step S34, the travel distance may be calculated on the basis of the vehicle speed data for the vehicle ID by the road map data integrated ECU 101.

Thereafter, the traffic control apparatus 100 may extend the estimated travel locus for the vehicle ID (step S35). In step S35, the road map data integrated ECU 101 may extend the latest estimated travel locus along the extension of the estimated travel locus so far, on the basis of the travel distance for the vehicle ID. The road map data integrated ECU 101 may carry out map-mapping of the latest estimated travel locus, or register the latest estimated travel locus in the road map data.

In step S33, in the case where the road map data integrated ECU 101 receives the latest linear coordinate Ln for the vehicle ID (YES in step S33), the traffic control apparatus 100 may perform matching processing of the latest linear coordinate Ln for the vehicle ID with the map data (step S36). In step S36, the road map data integrated ECU 101 may carry out the matching processing of the linear coordinate Ln for the vehicle ID with the road map data with respect to the previous estimated travel locus or the linear coordinate Lm−1 for the vehicle ID.

Thereafter, the traffic control apparatus 100 may carry out map-mapping of the latest linear coordinate Ln for the vehicle ID onto the map data (step S37). In step S37, the road map data integrated ECU 101 may carry out the map-mapping of the latest linear coordinate Ln for the vehicle ID to allow the latest linear coordinate Ln to be continuous with the previous estimated travel locus or the linear coordinate Lm−1 for the vehicle ID.

In the following, the map-mapping of the estimated travel locus and the actual travel locus of the vehicle M is described with reference to FIGS. 14 and 15. The map-matching is to be carried out by the traffic control apparatus 100.

Figure 14:
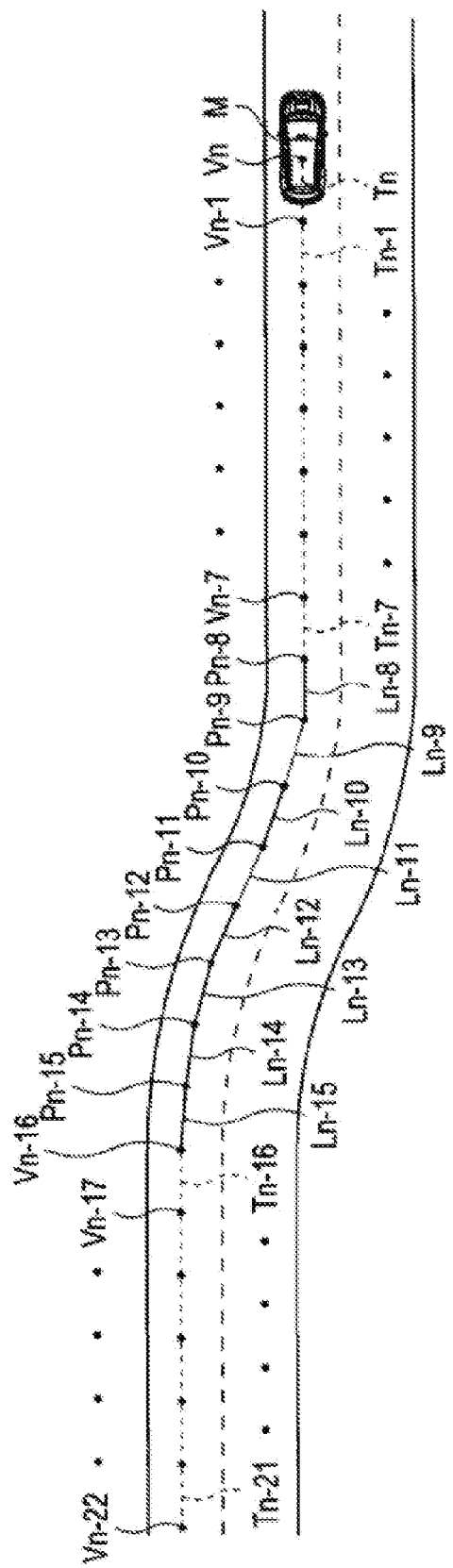
FIG. 14 illustrates map-matching by a traffic control apparatus, of a travel locus of a vehicle on curved travel including straight travel.
Figure 15:
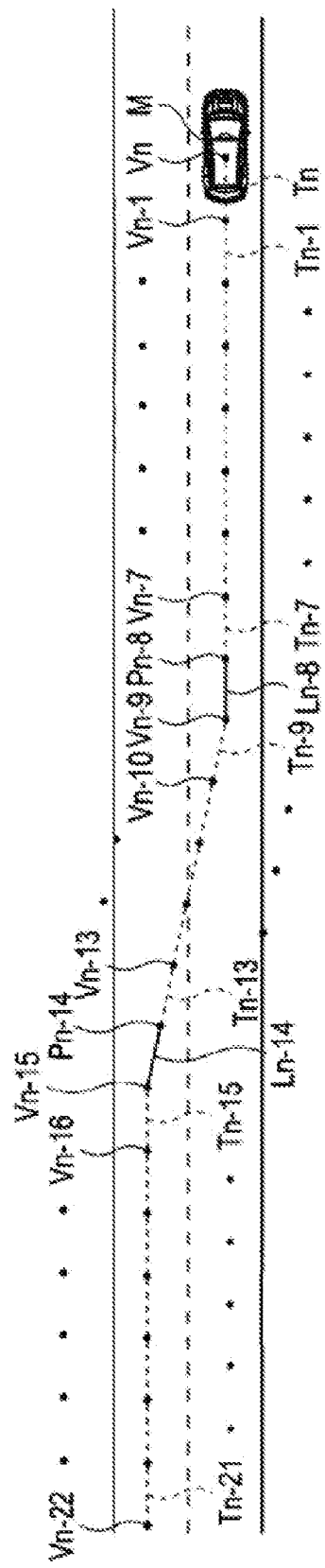
FIG. 15 illustrates map-matching by the traffic control apparatus, of a travel locus of a vehicle about to make a lane change including straight travel.

As illustrated in FIGS. 14 and 15, with the vehicle M on the straight travel, the traffic control apparatus 100 may receive, in step S31, the data regarding the vehicle ID and the vehicle speed Vn from the vehicle M on the predetermined cycles. On the basis of the vehicle ID, in step S31, the traffic control apparatus 100 may identify the previous estimated travel locus Tn−1 of the vehicle M, as denoted by a broken line. It is to be noted that in a case where the traffic control apparatus 100 has received the previous linear coordinate Lm−1 from the vehicle M, the traffic control apparatus 100 may identify the relevant linear coordinate Lm−1 for the vehicle ID.

Thereafter, in steps S34 and S35, the traffic control apparatus 100 may extend an estimated travel locus Tn denoted by a broken line, along an extension of the estimated travel locus Tn−1 or the extension of the linear coordinate Ln−1, and carry out map-mapping of the estimated travel locus Tn, or register the estimated travel locus Tn in the road map data. The estimated travel locus Tn−1 is obtained by calculating the travel distance on the basis of the previous vehicle speed Vn−1 received. The estimated travel locus Tn is obtained by calculating the travel distance on the basis of the latest vehicle speed Vn.

In the meanwhile, as illustrated in FIG. 14, with the vehicle M on the curved travel, in step S36, the traffic control apparatus 100 may perform the matching processing of the linear coordinates Ln−15 to Ln−8 denoted by a solid line, with the road map data, each time the traffic control apparatus 100 receives the linear coordinates Ln−15 to Ln−8 from the vehicle M. In step S37, the traffic control apparatus 100 may perform map-mapping of the linear coordinates Ln−15 to Ln−8 together with the vehicle ID.

In addition, as illustrated in FIG. 15, with the vehicle M making the lane change, the traffic control apparatus 100 may carry out map-mapping of the linear coordinate Ln−14 indicated by the solid line for the received vehicle ID.

Thereafter, on the subsequent cycle, the traffic control apparatus 100 receives the data regarding the vehicle ID and the vehicle speed Vn. Accordingly, the traffic control apparatus 100 may extend an estimated travel locus Tn−13 denoted by a broken line, along an extension of the previous linear coordinate Ln−14, and carry out mapping of the estimated travel locus Tn−13, or register the estimated travel locus Tn−13 in the road map data. The estimated travel locus Tn−13 is obtained by calculating the travel distance on the basis of the latest vehicle speed Vn−13. It is to be noted that, in a section of the estimated travel loci Tn−13 to Tn−9 indicated by a broken line, the traffic control apparatus 100 may make the same control on the predetermined cycles as that in the case where the vehicle M is on the straight travel.

Thereafter, upon receiving the linear coordinate Ln−8 from the vehicle M, the traffic control apparatus 100 may map the linear coordinate Ln−8 denoted by a solid line for the received vehicle ID, or register the linear coordinate Ln−8 in the road map data.

As described, with the vehicle M on the straight travel, the linear coordinate Ln is not transmitted from the vehicle M. Accordingly, the traffic control apparatus 100 may receive the vehicle speed Vn for the vehicle ID on the predetermined cycles, and calculate the travel distance on the basis of the vehicle speed Vn. Thus, the traffic control apparatus 100 may carry out map-matching, or register the estimated travel locus Tn of the vehicle M in the road map data.

The vehicle M may transmit the linear coordinate Ln in the case where the vehicle M is on the curved travel, making the lane change, or making the right turn or the left turn, with the traveling direction of the vehicle M changing exceeding the predetermined angle (e.g., ±2°). This saves the traffic control apparatus 100 from a processing load of the positional data, leading to reduction in an amount of data to be held. In other words, in the traffic control apparatus 100, an amount of communication data is reduced, leading to reduction in a communication load with the plurality of the vehicles M, a data processing load, and the amount of data storage to hold the positional data regarding the plurality of the vehicles M. The amount of the communication data is an amount of the latitude and longitude data indicating the own-vehicle positions of the plurality of the vehicles M.

As described, in the vehicle travel locus transmission system and the vehicle traffic control system according to this embodiment, it is possible to reduce the communication load between the traffic control apparatus 100 and the plurality of the vehicles M, the data processing load on the traffic control apparatus 100, and the amount of the data storage to be held by the traffic control apparatus 100.

It is to be noted that the traffic control apparatus 100 may analyze the travel loci of the plurality of the vehicles M on the road map data, to distribute travel assistance data to each of the vehicles M. Non-limiting examples of the travel assistance data may include a construction site, presence or absence of a parked vehicle such as a failed vehicle, presence or absence of data regarding traffic congestion and data regarding traffic accidents, and lane regulations.

The locator processor 13 of the locator unit 12 and the road map data integrated ECU 101 of the traffic control apparatus 100 may include a processor including a central processing unit (CPU) and a storage device such as a ROM and a RAM. A portion or all of a configuration of a plurality of circuits of the processor may also be implemented in software. For example, the CPU may read various programs held in the ROM and execute the programs to carry out processing corresponding to the respective circuits.

In addition, a portion or all of the processing to be carried out by the processor may be provided by a logic circuit or an analog circuit. Processing of the various programs may be implemented by an electronic circuit such as an FPGA.

The technology described above is not limited to the foregoing example embodiments, and various modifications may be made in the implementation stage without departing from the gist of the technology. Further, the foregoing example embodiments each include various stages of the technology, and various technologies may be extracted by appropriately combining the features of the technology disclosed herein.

For example, in a case where the above-described concerns may be addressed and the above-described effects may be obtained even if some features are deleted from all the features disclosed herein, the remaining features may be extracted as a technology.

Each of the locator processor 13 of the locator unit 12 and the road map data integrated ECU 101 of the traffic control apparatus 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the locator processor 13 of the locator unit 12 and the road map data integrated ECU 101 of the traffic control apparatus 100 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the locator processor 13 of the locator unit 12 and the road map data integrated ECU 101 of the traffic control apparatus 100 illustrated in FIG. 1.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle travel locus transmission system to be mounted on a vehicle, the vehicle travel locus transmission system comprising:
    a global navigation satellite system (GNSS) receiver configured to receive a positioning signal;
    a vehicle-side transceiver configured to send and receive data to and from an external device;
    a locator processor configured to perform calculation on a basis of road map data;
    a wheel speed sensor configured to detect a rotation speed of a wheel of the vehicle;
    a gyro sensor configured to detect an angular speed or an angular acceleration rate of the vehicle; and
    an acceleration rate sensor configured to detect an acceleration rate of the vehicle, wherein
    the locator processor is configured to generate, on predetermined cycles, a latest first linear coordinate as a linear function parameter that couples latest first positional coordinates and second positional coordinates on a previous cycle, the first positional coordinates and the second positional coordinates being acquired on a basis of the positioning signal received by the GNSS receiver,
    on a condition that an angle formed by the first linear coordinate with an extension of a second linear coordinate generated on the previous cycle exceeds a predetermined threshold, the locator processor is configured to send data regarding the first linear coordinate together with vehicle identification data, from the vehicle-side transceiver to the external device,
    on a condition that the angle formed by the first linear coordinate with the extension of the second linear coordinate generated on the previous cycle is equal to or within the predetermined threshold, the locator processor is configured to accumulate the formed angle, and
    on a condition that a total angle of the accumulated formed angle exceeds the predetermined threshold, the locator processor is configured to reset the accumulated angle to zero and send the data regarding the first linear coordinate together with the vehicle identification data, from the vehicle-side transceiver to the external device.

2. The vehicle travel locus transmission system according to claim 1, wherein
    the locator processor is configured to calculate a vehicle speed of the vehicle on the predetermined cycles on a basis of the rotation speed of the wheel detected by the wheel speed sensor, and send the vehicle speed together with the vehicle identification data from the vehicle-side transceiver to the external device.

3. The vehicle travel locus transmission system according to claim 1, wherein
    the locator processor is configured to map the first linear coordinate on the road map data, the first linear coordinate being generated on the predetermined cycles.

4. A vehicle traffic control system provided with a traffic control apparatus, the traffic control apparatus including a device-side transceiver, the device-side transceiver being configured to send and receive data to and from a vehicle travel locus transmission system,
the vehicle travel locus transmission system being mounted to a vehicle and including:
a global navigation satellite system (GNSS) receiver configured to receive a positioning signal;
a vehicle-side transceiver configured to send and receive data to and from the device-side transceiver;
a locator processor configured to perform calculation on a basis of road map data;
a wheel speed sensor configured to detect a rotation speed of a wheel of the vehicle;
a gyro sensor configured to detect an angular speed or an angular acceleration rate of the vehicle; and
an acceleration rate sensor configured to detect an acceleration rate of the vehicle, wherein
the locator processor is configured to generate, on predetermined cycles, a latest first linear coordinate as a linear function parameter that couples latest first positional coordinates and second positional coordinates on a previous cycle, the first positional coordinates and the second positional coordinates being acquired on a basis of the positioning signal received by the GNSS receiver,
on a condition that an angle formed by the first linear coordinate with an extension of a second linear coordinate generated on the previous cycle exceeds a predetermined threshold, the locator processor is configured to send data regarding the first linear coordinate together with vehicle identification data, from the vehicle-side transceiver to the device-side transceiver,
on a condition that the angle formed by the first linear coordinate with the extension of the second linear coordinate generated on the previous cycle is equal to or within the predetermined threshold, the locator processor is configured to accumulate the formed angle, and
on a condition that a total angle of the accumulated formed angle exceeds the predetermined threshold, the locator processor is configured to reset the accumulated angle to zero and send the data regarding the first linear coordinate together with the vehicle identification data, from the vehicle-side transceiver to the external device, and
the vehicle traffic control system comprising
a server device that is coupled to the device-side transceiver and holds road map data, wherein
on a condition that the server device receives the first linear coordinate regarding the vehicle identification data, the server device is configured to search the road map data for a past first travel locus regarding the vehicle identification data, and match the first linear coordinate with the road map data to map the first linear coordinate as a new second travel locus onto the road map data.

5. The vehicle traffic control system according to claim 3, wherein the locator processor is configured to calculate a vehicle speed of the vehicle on the predetermined cycles on a basis of the rotation speed of the wheel detected by the wheel speed sensor, and send the vehicle speed together with the vehicle identification data from the vehicle-side transceiver to the device-side transceiver, and on a condition that the server device receives the vehicle speed regarding the vehicle identification data without receiving the first linear coordinate, the server device is configured to calculate a travel distance on a basis of the vehicle speed, and map the new second travel locus corresponding to the travel distance, along an extension of the past first travel locus regarding the vehicle identification data, onto the road map data.

6. A vehicle travel locus transmission system to be mounted on a vehicle, the vehicle travel locus transmission system, comprising:
a global navigation satellite system (GNSS) receiver configured to receive a positioning signal;
a vehicle-side transceiver configured to send and receive data to and from an external device;
circuitry configured to perform calculation on a basis of road map data;
a wheel speed sensor configured to detect a rotation speed of a wheel of the vehicle;
a gyro sensor configured to detect an angular speed or an angular acceleration rate of the vehicle; and
an acceleration rate sensor configured to detect an acceleration rate of the vehicle, wherein
the circuitry is configured to generate, on predetermined cycles, a latest first linear coordinate as a linear function parameter that couples latest first positional coordinates and second positional coordinates on a previous cycle, the first positional coordinates and the second positional coordinates being acquired on a basis of the positioning signal received by the GNSS receiver,
on a condition that an angle formed by the first linear coordinate with an extension of a second linear coordinate generated on the previous cycle exceeds a predetermined threshold, the circuitry is configured to send data regarding the first linear coordinate together with vehicle identification data, from the vehicle-side transceiver to the external device,
on a condition that the angle formed by the first linear coordinate with the extension of the second linear coordinate generated on the previous cycle is equal to or within the predetermined threshold, the circuitry is configured to accumulate the formed angle, and
on a condition that a total angle of the accumulated formed angle exceeds the predetermined threshold, the circuitry is configured to reset the accumulated angle to zero and send the data regarding the first linear coordinate together with the vehicle identification data, from the vehicle-side transceiver to the external device.

* * * * *